(12) United States Patent  (10) Patent No.: US 7,339,581 B2
Katayose  (45) Date of Patent: Mar. 4, 2008

(54) INPUT CONTROL APPARATUS AND METHOD FOR RESPONDING TO INPUT

(75) Inventor: Jun Katayose, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 545 days.

(21) Appl. No.: 11/016,554

(22) Filed: Dec. 17, 2004

(65) Prior Publication Data

US 2005/0156904 A1  Jul. 21, 2005

(30) Foreign Application Priority Data

Dec. 26, 2003  (JP) ............................. 2003-432530

(51) Int. Cl.
  *G06F 3/041*  (2006.01)
(52) U.S. Cl. .................... 345/173; 178/18.01
(58) Field of Classification Search ........ 345/156–160, 345/162, 166, 172–179; 178/18.01, 18.03, 178/18.04, 18.05, 18.06
  See application file for complete search history.

(56) References Cited

U.S. PATENT DOCUMENTS

| 2002/0097229 | A1 | 7/2002 | Rose et al. |
| 2003/0067449 | A1 | 4/2003 | Yoshikawa et al. |
| 2003/0174121 | A1 | 9/2003 | Poupyrev et al. |
| 2006/0152497 | A1* | 7/2006 | Rekimoto .................... 345/173 |

FOREIGN PATENT DOCUMENTS

| EP | 1310860 A | 5/2003 |
| EP | 1333364 A | 8/2003 |
| GB | 2380583 A | 4/2003 |
| JP | 09-062446 | 3/1997 |
| JP | 09 062446 A | 3/1997 |
| JP | 2000-137576 | 5/2000 |
| JP | 2000 137576 A | 5/2000 |
| JP | 2003-016502 | 1/2003 |
| JP | 2003 016502 A | 1/2003 |

* cited by examiner

*Primary Examiner*—Richard Hjerpe
*Assistant Examiner*—Mansour M. Said
(74) *Attorney, Agent, or Firm*—Brinks Hofer Gilson & Lione

(57) ABSTRACT

In a menu window, when a user touches an area outside buttons on a touch panel, a main control unit vibrates the touch panel by using a first vibration pattern. When the user moves his/her finger along the touch panel so as to reach the range of coordinates of one of the buttons, the main control unit generates the first vibration pattern which indicates the acceptance of an operation of selecting the button and changes the color of the button to a color indicating a button selected state when the touched position reaches the range of the button. Then, the main control unit accepts an operation of deciding the button according to a release operation or long touch performed thereafter.

19 Claims, 4 Drawing Sheets

VP1

VP2

INPUT CONTROL APPARATUS AND METHOD FOR RESPONDING TO INPUT

BACKGROUND OF THE INVENTION

1. Field of the Invention

The present invention relates to a user interface including a display device and a touch panel disposed on a screen of the display device.

2. Description of the Related Art

As a technique related to a user interface using a touch panel disposed on a screen of a display device, the following technique has been known. That is, a vibrator for vibrating a touch panel is provided, a user's operation of touching an area of the touch panel corresponding to a button displayed on a display device is accepted as a button touching operation, and a response to the touch operation is fed back to the user by using vibration of the touch panel (e.g., Patent Documents 1 and 2: Japanese Unexamined Patent Application Publication Nos. 2003-16502 and 2000-137576).

Also, as another technique related to a user interface using a touch panel disposed on a screen of a display device, the following technique has been known. That is, after a user has touched a touch panel, a button displayed in an area of a display device corresponding to the touched position just before a release operation (user's operation of releasing his/her finger from the touch panel) is accepted as a button decided by the user (e.g., Patent Documents 1 and 3: Japanese Unexamined Patent Application Publication Nos. 2003-16502 and 9-62446).

Furthermore, in these techniques, when the user performs touch and release operations on the touch panel, if the touched position just before the release operation is different from the position of the button corresponding to the touched position at the touch operation, selection of the released button is not accepted (e.g., Patent Document 3).

The sensitivity characteristic of a touch panel varies from one product to another. More specifically, the forces to be exerted on a touch panel and the touch angle required for allowing the touch panel to detect a touch vary from one touch panel to another.

For this reason, even when a user touches a proper operating position on a touch panel, the touch panel may not be able to detect the touch and accept the operation according to the user's intention, depending on the user's operation or user's status.

SUMMARY OF THE INVENTION

Accordingly, an object of the present invention is enabling a user to perform an operation according to the user's intention more reliably in a user interface using a touch panel disposed on a screen of a display device.

In order to achieve the object, according to an aspect of the present invention, an input control apparatus including a display device, a touch panel disposed on the display device, and a vibrating unit for vibrating the touch panel is provided. The input control apparatus includes a screen display unit for displaying, on the display device, an operation screen which includes one or a plurality of buttons for accepting an operation by a user; and a vibration control unit for controlling the vibration of the touch panel by the vibrating unit. The vibration control unit allows the vibrating unit to momentarily vibrate the touch panel when the user touches a position on the touch panel outside the buttons on the operation screen, the vibration control unit does not allow the vibrating unit to vibrate the touch panel until the touched position changes to a position corresponding to one of the buttons in a case where the touched position on the touch panel changes to the position corresponding to the button thereafter, and the vibration control unit directs the vibrating unit to vibrate the touch panel when the touched position changes to the position corresponding to the button.

In this input control apparatus, when a user's touch on an area outside of the buttons is detected, the detection of touch is notified to the user by generating vibration. Therefore, the user can determine whether his/her way of touching is appropriate by touching an area outside the buttons, that is, an area which is irrelevant to the operation. Further, after the user has touched a position outside of the buttons, when the user moves his/her finger along the touch panel in order to touch a desired button, vibration indicating that the touched position is within the range of the button is given to the user. Accordingly, the user can simultaneously perform a determination of the appropriateness of his/her way of touching and movement of the touched position to the desired button reliably by performing a sequential operation of moving his/her finger from the outside of the buttons to the desired button.

The input control apparatus may further include a button-deciding-operation accepting unit for accepting an operation of deciding a button according to a user's subsequent operation when the touched position on the touch panel changes to a position corresponding to the button after the user has touched a position outside of the buttons on the touch panel.

With this configuration, the user can perform a button deciding operation by performing the sequential operation or an operation successive to the sequential operation.

Preferably, the screen display unit changes the color of the button corresponding to the touched position so that the user can distinguish the button from other buttons. With this configuration, the user can touch a desired button or move the touched position to the desired button more reliably.

Further, the input control apparatus of the present invention including a display device, a touch panel disposed on the display device, and a vibrating unit for vibrating the touch panel also includes an operation responding unit which responds to a touch operation on the touch panel by the user by controlling the vibrating unit. In the operation responding unit, responding to the touch operation on the touch panel by the user is performed through a tactile feel generated by vibration of the touch panel and through a sound generated by the vibration by controlling the vibrating unit. The same vibration may be used for providing a tactile feel as a response and for generating a sound as a response.

In this input control apparatus, the touch panel is used as a source of a tactile feel and sound, so that a response to a touch operation on the touch panel can be provided to the user. Therefore, a clear response using a sound as well as vibration can be fed back to the user with this efficient configuration.

According to the present invention, in a user interface using a touch panel disposed on a screen of a display device, the user can perform an operation according to his/her intention more easily and reliably.

DESCRIPTION OF THE PREFERRED EMBODIMENT

Hereinafter, an embodiment of the present invention will be described.

Figure 1:
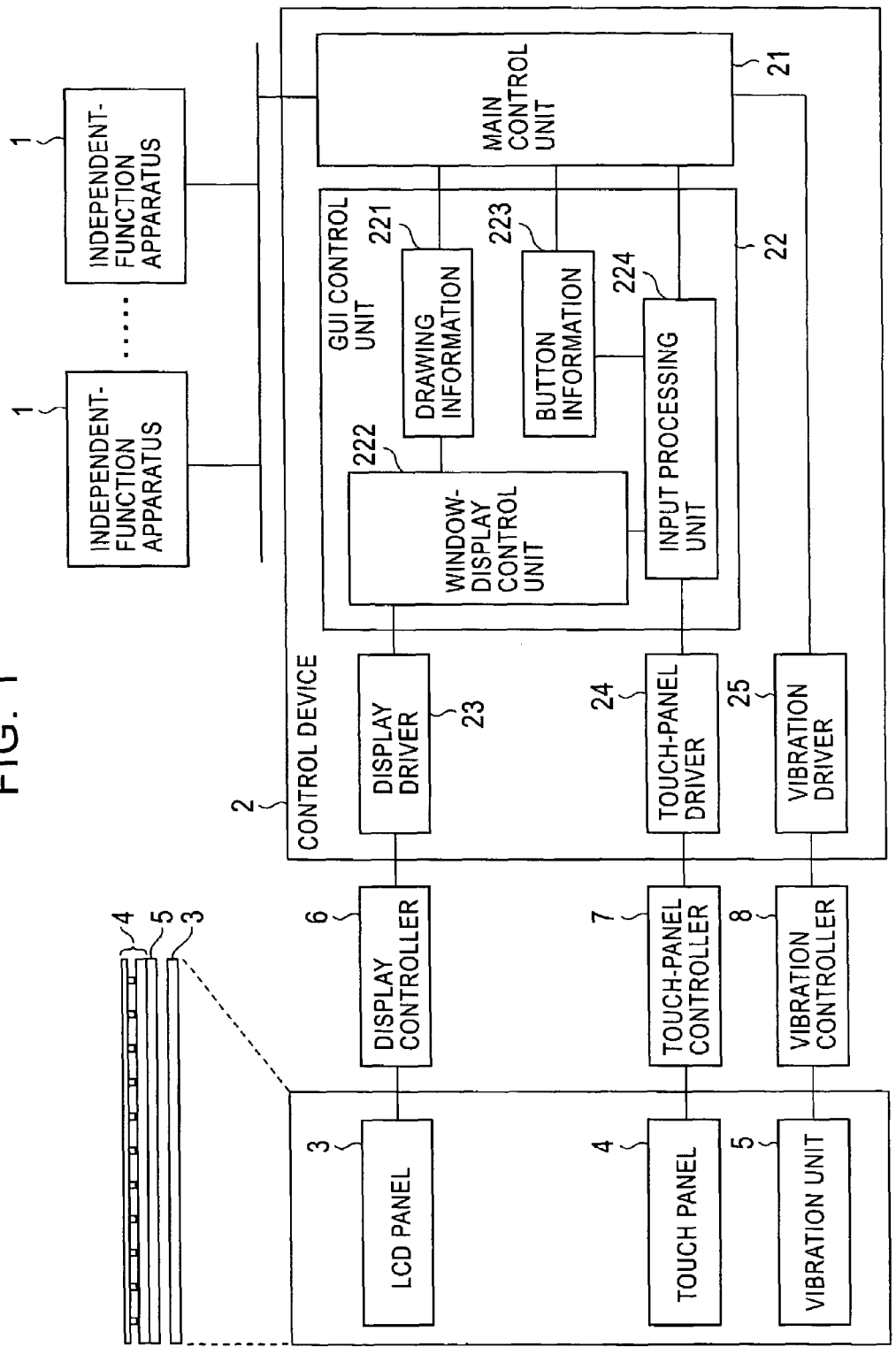
FIG. 1 is a block diagram showing the configuration of an electronic processing system according to an embodiment of the present invention.

FIG. 1 shows the configuration of an electronic processing system according to the embodiment.

As shown in FIG. 1, the electronic processing system includes independent-function apparatuses 1 having an independent function, such as an audio apparatus and a navigation apparatus; a control device 2 for controlling each of the independent-function apparatuses 1; a liquid crystal display (LCD) panel 3; a touch panel 4; a vibration unit 5; a display controller 6 for driving the LCD panel 3; a touch-panel controller 7 for detecting occurrence of touch/release operations on the touch panel 4 and touched coordinates (coordinates of a touched position); and a vibration controller 8 for driving the vibration unit 5.

As shown in FIG. 1, the vibration unit 5 is disposed under the touch panel 4 so as to be coupled therewith and vibrates the touch panel 4. The LCD panel 3 is disposed under the touch panel 4 and the vibration unit 5.

Specifically, the control device 2 includes a main control unit 21 for providing a graphical user interface (GUI) to a user and controlling each independent-function apparatus 1 according to a user's operation accepted by the GUI; a GUI control unit 22 for executing display processing on the LCD panel 3 in the GUI and processing on the input from the touch panel 4; a display driver 23 for mediating input/output of data between the GUI control unit 22 and the display controller 6; a touch-panel driver 24 for mediating input/output of data between the GUI control unit 22 and the touch panel 4; and a vibration driver 25 for mediating input/output of data between the vibration unit 5 and the main control unit 21. In a hardware sense, the control device 2 may be a computer of an ordinary configuration which includes a CPU, a main memory, and an external storage device. In this case, each of the above-mentioned components in the control device 2 may be realized as a process which is embodied in the control device 2 when the CPU executes a computer program stored in the external storage device. Also, in this case, the GUI control unit 22 and each driver may be realized as a mechanism or expanded function of an operating system executed in the control device 2. Further, the main control unit 21 may be realized as an application which is operated on the operating system.

More specifically, the GUI control unit 22 includes a window-display control unit 222 for displaying an image of a window on the LCD panel 3 according to drawing information 221 transmitted from the main control unit 21; and an input processing unit 224 for analyzing and processing input information from the touch-panel controller 7 by referring to button information 223 transmitted from the main control unit 21.

In the above-described configuration, in order to display a menu window including buttons for accepting a user operation, the main control unit 21 writes the drawing information 221, which defines an image displayed in the menu window, into the GUI control unit 22. Also, the main control unit 21 writes the button information 223, which describes the range of coordinates of each button in the menu window and processing to be performed by the input processing unit 224 when a user operates the button, into the GUI control unit 22.

The window-display control unit 222 displays the menu window on the LCD panel 3 in accordance with the drawing information 221, which has been written by the main control unit 21 as described above.

The input processing unit 224 stores the latest touched coordinates input from the touch-panel controller 7 and provides the stored touched coordinates to the main control unit 21 according to an access from the main control unit 21. Also, the input processing unit 224 analyzes the input of a touch operation, a release operation, and touched coordinates transmitted from the touch-panel controller 7 by referring to the button information 223, and executes the following processing.

That is, if the touched coordinates at the moment when a touch operation occurs are within the range of coordinates of a button, the input processing unit 224 transmits a button identifier of the corresponding button and a button-touch occurrence event to the main control unit 21. On the other hand, if the touched coordinates at the occurrence of a touch operation are outside the range of coordinates of all the buttons, the input processing unit 224 transmits an outside-of-button touch occurrence event to the main control unit 21. If a release operation has occurred, the input processing unit 224 transmits a release occurrence event to the main control unit 21. Further, if the touched coordinates shift from the outside of the coordinates of all the buttons to the coordinates of one of the buttons during a period from a touch operation to a release operation, the input processing unit 224 transmits a button identifier of the corresponding button and a move-to-button occurrence event to the main control unit 21.

The main control unit 21 controls the user interface by executing the following process of accepting a button operation by using the above-described GUI control unit 22, so as to accept a user's operation on the buttons in the menu window.

Figure 2:
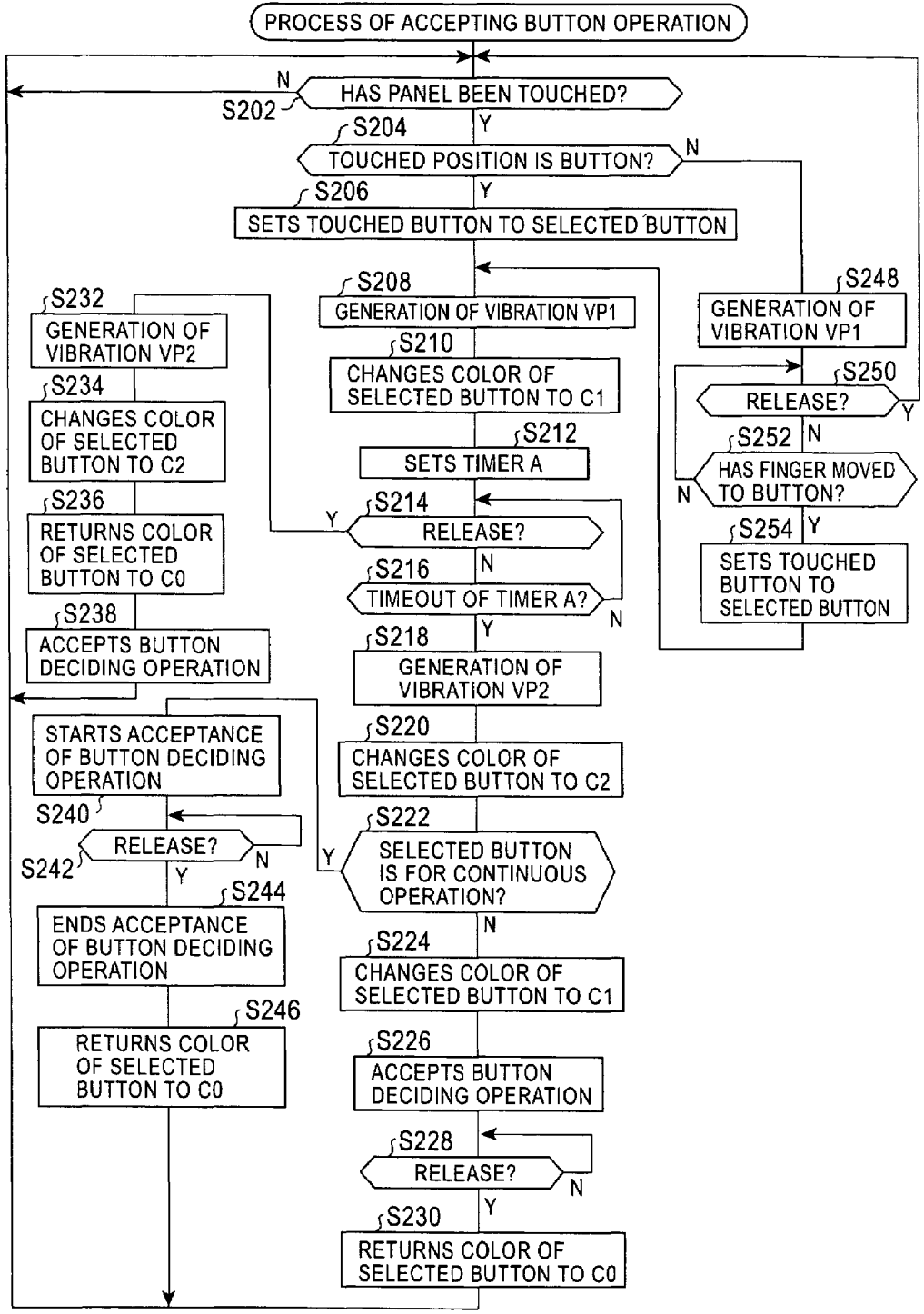
FIG. 2 is a flowchart showing a process of accepting a button operation according to an embodiment of the present invention.
Figure 3:
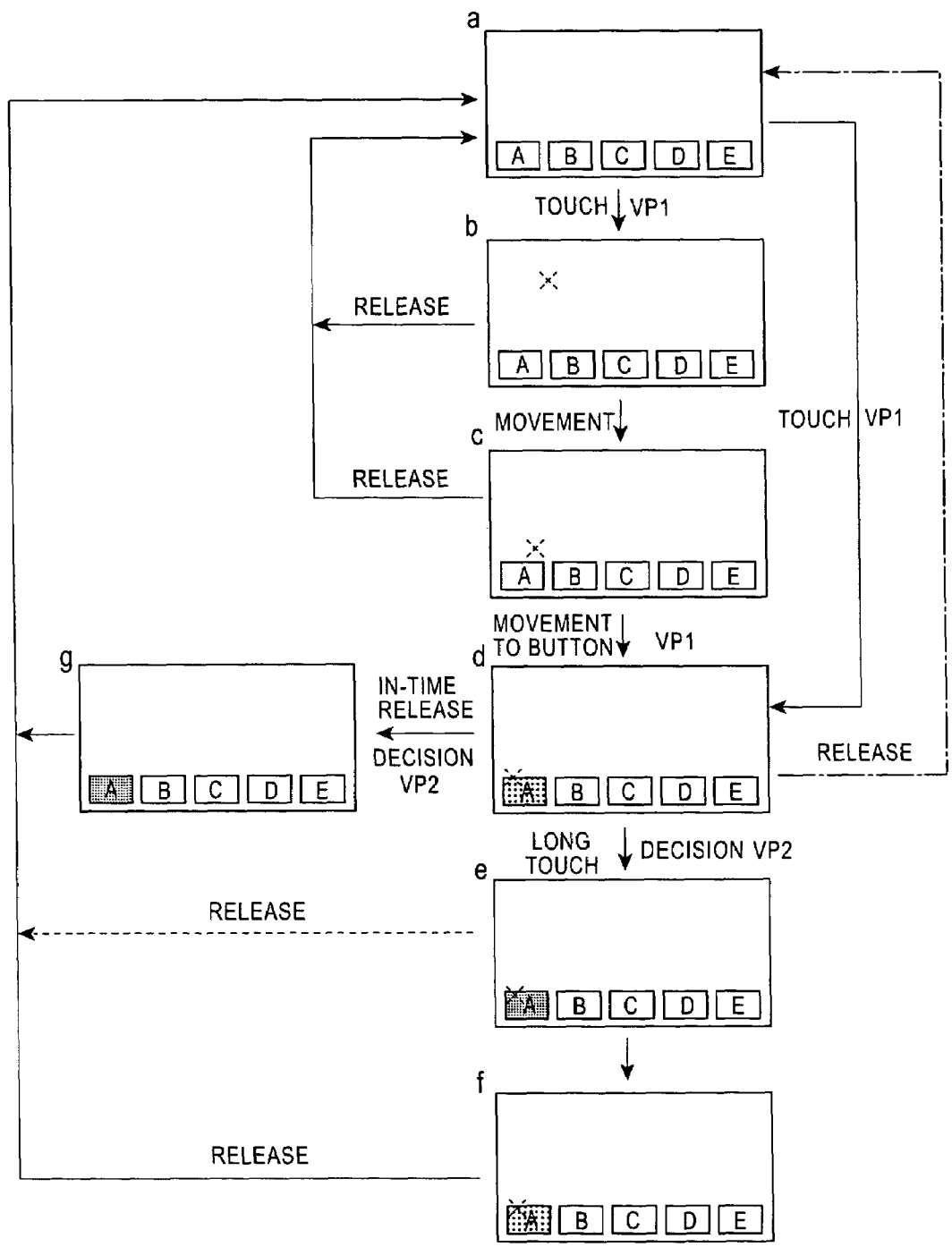
FIG. 3 shows an example of the transition of display according to an embodiment of the present invention.

FIG. 2 is a flowchart of the process of accepting a button operation. FIG. 3 shows an example of transition of the menu window.

As shown in part a of FIG. 3, in the initial state, a plurality of buttons A to E are displayed in an initial display color C0 in the menu window.

In this state, in the process of accepting a button operation, the system waits for occurrence of touch on the touch panel by a user (step S202). The occurrence of touch on the touch panel can be detected based on an outside-of-button touch occurrence event or a button-touch occurrence event.

After touch on the touch panel by the user has occurred, it is determined whether the touched position corresponds to a button, that is, whether the occurred event is an outside-of-button touch occurrence event or a button-touch occurrence event (step S204). If the touched position corresponds to a button, the touched button is set to a selected button (step S206). Then, the vibration unit 5 is allowed to generate a vibration pattern VP1 which represents the acceptance of a button selecting operation via the vibration driver 25 and the vibration controller 8 (step S208). Further, the button information 223 is rewritten so that the color of the selected button is changed to a color C1 indicating a selected state (step S210). As a result, in the menu window, the color of the touched button A is changed to the color C1 (e.g., orange) indicating a selected state, as shown in part d in FIG. 3.

Incidentally, a mark "x" shown by a broken line in FIG. 3 is added to the figure in order to indicate the position touched by the user, and is not actually displayed in the menu window.

Then, a timer A for determining a long touch, which is set for timeout period T1, is started (step S212), and then monitoring is performed in order to detect the occurrence of release (step S214); and the occurrence of a timeout of the timer A (step S216).

Herein, the timeout period T1 of the timer A is 250 msec, for example. The occurrence of release is detected based on a release occurrence event.

If release has occurred (step S214), the vibration unit 5 is allowed to generate a vibration pattern VP2 representing the acceptance of a button deciding operation via the vibration driver 25 and the vibration controller 8 (step S232). Then, the button information 223 is rewritten so that the color of the selected button is changed to a color C2 indicating the acceptance of the button deciding operation only for a period T2 (e.g., 150 msec) (step S234). As a result, in the menu window, the color of the released button A is changed to the color C2 indicating the acceptance of a button deciding operation, as shown in part g in FIG. 3.

After the period T2, when the color of the selected button is in the color C2, has passed, the color of the selected button is returned to the initial color C0 (step S236). Then, the main control unit 21 accepts the user's operation of deciding the selected button A (step S238), starts execution of processing corresponding to the selected button A (e.g., control of the operation of the independent-function apparatus 1), and then the process returns to step S202. Accordingly, the display in the menu window returns to part a in FIG. 3.

On the other hand, if a timeout of the timer A occurs in step S216, that is, if the user keeps the button touched for a long time, the vibration unit 5 is allowed to generate the vibration pattern VP2 representing the acceptance of a button deciding operation via the vibration driver 25 and the vibration controller 8 (step S218). Then, the button information 223 is rewritten so that the color of the selected button is changed to the color C2 indicating the acceptance of the button deciding operation (step S220). As a result, in the menu window, the color of the button A touched for a long time is changed to the color C2 indicating the acceptance of the button deciding operation, as shown in part e in FIG. 3.

Then, it is determined whether the selected button is a button for accepting a continuous operation (step S222). Herein, the button for accepting a continuous operation is a button for accepting an operation of constantly performing processing corresponding to the button repeatedly during a time period when the button is being operated, such as a volume turning up/down operation.

If the selected button is not a button for accepting a continuous operation (step S222), the color of the selected button is kept in the color C2 only for the period T2, and then the color of the selected button is returned to C1 indicating a selected state (step S224). Accordingly, in the menu window, the color of the button A touched for a long time is changed to the color C1 indicating the acceptance of a button selecting operation, as shown in part f in FIG. 3.

The main control unit 21 accepts a user's operation of deciding the selected button A (step S226) and starts execution of processing corresponding to the selected button A. Also, monitoring is performed in order to detect the occurrence of release (step S228). Herein, the occurrence of release is detected based on a release occurrence event.

If release has occurred (step S228), the color of the selected button is returned to the initial color C0 (step S230), and then the process returns to step S202. Accordingly, the display of the menu window returns to part a in FIG. 3.

On the other hand, if it is determined that the selected button is a button for accepting a continuous operation in step S222, acceptance of a user's operation of deciding the selected button A is started (step S240) while keeping the color of the selected button in the color C2 indicating the acceptance of the button deciding operation (while maintaining the display state shown in part e in FIG. 3), and the processing corresponding to the selected button A is constantly performed repeatedly until the end of acceptance of the deciding operation. Incidentally, an arrow of a broken line shown in FIG. 3 indicates a transition route of display in a case where the selected button is a button for accepting a continuous operation.

After starting the acceptance of an operation of deciding the selected button, which is a button for accepting a continuous operation (step S240), monitoring is performed in order to detect the occurrence of release (step S242). Herein, the occurrence of release is detected based on a release occurrence event.

If release has occurred (step S242), acceptance of the operation of deciding the selected button is ended (step S244), the color of the selected button is returned to the initial color C0 (step S246), and then the process returns to step S202. Accordingly, the display in the menu window returns to part a in FIG. 3.

When the user touches a position outside the button area, as shown in part b in FIG. 3, it is determined that the touch operation occurred in step S202 is a touch on a position outside the range of coordinates of the buttons. In this case, the main control unit 21 generates the vibration pattern VP1, which is the same as the vibration pattern representing acceptance of a button selecting operation, so as to notify the user that the touch operation has been accepted (step S248). Then, the main control unit 21 performs monitoring in order to detect occurrence of release (step S250) and occurrence of movement of the touched position to the range of a button (step S252). Herein, the occurrence of release is detected based on a release occurrence event and the movement of the touched position to the range of a button is detected based on a move-to-button occurrence event.

If release has occurred, the process returns to step S202. On the other hand, if the touched position has moved to the range of coordinates of a button, the corresponding button is set to a selected button (step S254), and the process proceeds to step S208 so as to perform the subsequent steps in the above-described manner.

In this way, as shown in part b in FIG. 3, when the user touches a position outside the buttons, the vibration pattern VP1 is generated. Then, when the user moves his/her finger along the touch panel 4 from the position to the range of coordinates of button A, as shown in parts c and d in FIG. 3, the vibration pattern VP1 indicating the acceptance of button A selecting operation is generated again when the user's finger reaches the range of button A, as shown in part d in FIG. 3. At the same time, the color of button A is changed to the color C1 which indicates a button selected state. After that, an operation of deciding button A is accepted according to a release operation or a long touch thereafter, as shown in parts e, f, and g in FIG. 3.

The process of accepting a button operation has been described above.

Figure 4A:
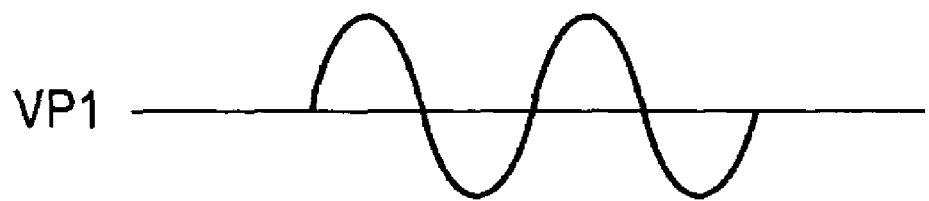
FIGS. 4A and 4B show vibration patterns used in an embodiment of the present invention.
Figure 4B:
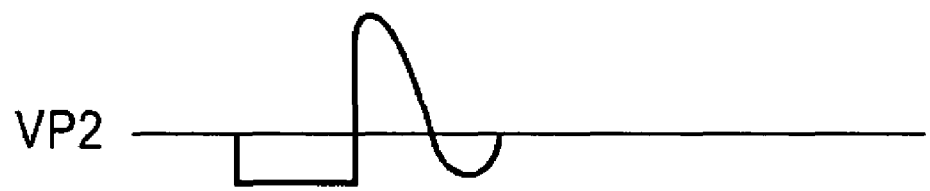

FIG. 4A shows the vibration pattern VP1, which is used for notifying the user of acceptance of a button selecting operation in the process of accepting a button operation, and FIG. 4B shows the vibration pattern VP2, which is used for notifying the user of acceptance of a button deciding operation.

In these figures, FIG. 4A shows the waveform of the vibration pattern VP1 and FIG. 4B shows the waveform of the vibration pattern VP2. As shown in FIG. 4A, the vibration pattern VP1 is in a form of a sine wave and the frequency thereof is 120 kHz, for example. The vibration pattern VP1 gives the user a relatively heavy tactile feel. On the other hand, as shown in FIG. 4B, the vibration pattern VP2 is in a form of a single wave having a steep rise and gives the user a definitive tactile feel. Further, in the vibration pattern VP2, the intensity and frequency thereof are set according to the characteristic of the touch panel 4 so as to generate a click sound by vibrating air by vibrating the touch panel 4. In this way, by generating a sound by vibrating the touch panel 4, feedback to a user's operation can be definitely supplied to the user by using a sound as well as vibration.

An embodiment of the present invention has been described above.

As described above, according to one embodiment, when a user's touch on an area outside the buttons is detected, the detection of touch is notified to the user by generating vibration. Therefore, the user can determine whether his/her way of touching is appropriate by touching an area outside the buttons, that is, an area which is irrelevant to the operation of the electronic processing system. Further, after the user has touched a position outside the buttons, when the user moves his/her finger along the touch panel 4 in order to touch a desired button, vibration indicating that the touched position is within the range of the button is given to the user. Accordingly, the user can simultaneously perform determination of appropriateness of his/her way of touching and movement of the touched position to the desired button reliably by performing a sequential operation of moving his/her finger from the outside of the buttons to the desired button.

In the above-describe embodiment, if the touched position at the occurrence of touch is in an area outside the buttons and if the touched position moves to the range of a button by finger movement thereafter, vibration is generated and the color of the touched button is changed according to the movement. As indicated by an arrow of a dashed line from part d to part a in FIG. 3, a button deciding operation by release or a long touch thereafter may not be accepted. In that case, too, the user can decide a desired button by performing a simple and reliable operation of, after moving his/her finger from the outside of the button area to the desired button, once releasing his/her finger from the touch panel 4, and then touching the same button again.

Further, in the above-described embodiment, after a button has been selected, if the touched position moves to another button or a position outside all the buttons by finger movement, acceptance of a button deciding operation by release or a long touch thereafter may be refused.

In the above-described embodiment, the main control unit 21 controls changes in the color of a button and vibration. Alternatively, the GUI control unit 22 may perform the control based on definition information of a button-color changing sequence and a vibration generating sequence, which is set by the main control unit 21.

What is claimed is:

1. An input control apparatus having a display device with a touch panel, the input control apparatus comprising:

a screen display displaying, on the display device, an operation screen which includes buttons for accepting an operations selected by a user;
vibrating means for vibrating the touch panel; and
vibration control means for controlling the vibration of the touch panel by the vibrating means,
wherein the vibration control means directs the vibrating means to momentarily vibrate the touch panel when the user touches a position on the touch panel outside the buttons on the operation screen, subsequently the vibration control means does not allow the vibrating means to vibrate the touch panel until the touched position changes from the position on the touch panel outside the buttons to a position corresponding to one of the buttons during a continuous touch operation by the user, and the vibration control means directs the vibrating means to vibrate the touch panel when the touched position changes to the position corresponding to the button.

2. An input control apparatus according to claim 1, further comprising accepting means for accepting an operation selected according to a user's subsequent operation when the touched position on the touch panel changes to a position corresponding to the button after the user has touched a position outside the buttons on the touch panel.

3. An input control apparatus according to claim 2, wherein the color of the button corresponding to the touched position changes so that the user can distinguish the button from other buttons.

4. An input control apparatus according to claim 3, wherein the vibration control means generates a first vibration pattern when the user touches a position outside the buttons on the touch panel, and generates a second vibration pattern when the operation selected is accepted.

5. An input control apparatus according to claim 4, wherein the first vibration pattern is in a form of a sine wave and the second vibration pattern is in a form of a wave having a steep rise.

6. An input control apparatus according to claim 2, wherein the user's subsequent operation is one of a release operation and a long touch.

7. An input control apparatus according to claim 2, wherein the input control apparatus and the independent function apparatuses having an independent function are included in an electronic system.

8. An input control apparatus according to claim 7, wherein the independent function apparatuses include an audio apparatus and a navigation apparatus.

9. An input control apparatus according to claim 1, wherein the vibration control means provides the user with a response to the touch operation on the touch panel through a tactile feel generated by vibration of the touch panel and through a sound generated by the vibration by controlling the vibrating means.

10. An input control apparatus according to claim 1, further comprising accepting means which does not accept an operation selected according to a user's subsequent operation when the touched position on the touch panel changes to a position corresponding to the button after the user has touched a position outside the buttons on the touch panel.

11. An input control apparatus according to claim 1, further comprising accepting means which does not accept an operation selected by a subsequent release or long touch when the touched position on the touch panel changes to a position corresponding to the button after the user has touched a position outside the buttons on the touch panel and when the touched position corresponding to the button in a selected state changes to a position corresponding to another button or a position outside the buttons.

12. A method for responding to input by a user through a tactile feel by using a user interface apparatus comprising a display device having a touch panel and vibrating means for vibrating the touch panel, the method comprising:

displaying, on the display device, an operation screen which includes buttons for accepting operations selected by a user; and directing the vibrating means to momentarily vibrate the touch panel when the user touches a position on the touch panel outside the buttons on the operation screen, subsequently not allowing the vibrating means to vibrate the touch panel until the touched position changes from outside the buttons to a position corresponding to one of the buttons during a single touch operation, and then directing the vibrating means to vibrate the touch panel when the touched position changes to the position corresponding to the button.

13. A method for responding to input according to claim 12, further comprising accepting an operation selected according to a user's subsequent operation when the touched position on the touch panel changes to a position corresponding to the button after the user has touched a position outside the buttons on the touch panel.

14. A method for responding to input according to claim 13, further comprising changing the color of the button corresponding to the touched position so that the user can distinguish the button from other buttons.

15. A method for responding to input according to claim 13, wherein the user's subsequent operation is one of a release operation and a long touch.

16. A computer-readable medium storing a computer program which is read and executed by a computer having a display device with a touch panel and vibrating means for vibrating the touch panel, the computer program directing the computer to:

display, on the display device, an operation screen which includes at least one button for accepting an operation selected by a user; and direct the vibrating means to momentarily vibrate the touch panel when the user touches a position on the touch panel outside any buttons displayed on the operation screen, subsequently not allow the vibrating means to vibrate the touch panel until the touched position changes from outside of all of the buttons displayed to a position corresponding to one of the buttons during a continuous touch operation, and direct the vibrating means to vibrate the touch panel when the touched position changes to the position corresponding to the button.

17. A computer-readable medium according to claim 16, the computer program further directing the computer to accept an operation selected according to a user's subsequent operation when the touched position on the touch panel changes to a position corresponding to the button after the user has touched a position outside the buttons on the touch panel.

18. A computer-readable medium according to claim 17, the computer program further directing the computer to change the color of the button corresponding to the touched position so that the user can distinguish the button from other buttons.

19. A computer-readable medium according to claim 17, wherein the user's subsequent operation is one of a release operation or a long touch.

* * * * *